(12) United States Patent
Luo et al.

(10) Patent No.: US 11,463,462 B2
(45) Date of Patent: Oct. 4, 2022

(54) BOT BEHAVIOR DETECTION

(71) Applicant: Microsoft Technology Licensing, LLC, Redmond, WA (US)

(72) Inventors: Yang Luo, Beijing (CN); Peng Cheng, Beijing (CN); Yongqiang Xiong, Beijing (CN); Qian Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 16/442,819

(22) Filed: Jun. 17, 2019

(65) Prior Publication Data
US 2020/0396233 A1    Dec. 17, 2020

(51) Int. Cl.
*H04L 9/40* (2022.01)
*G06N 3/08* (2006.01)
*G06K 9/62* (2022.01)

(52) U.S. Cl.
CPC .......... *H04L 63/1425* (2013.01); *G06K 9/628* (2013.01); *G06K 9/6256* (2013.01); *G06N 3/08* (2013.01); *H04L 63/10* (2013.01); *H04L 2463/144* (2013.01)

(58) Field of Classification Search
CPC ............. H04L 63/1425; H04L 63/1416; H04L 63/1408; H04L 63/1433; H04L 63/10; H04L 2463/144; G06F 11/3476; H04W 12/12; H04W 12/08; G06K 9/6256; G06K 9/628; G06N 3/08
See application file for complete search history.

(56) References Cited

U.S. PATENT DOCUMENTS

| | | | |
|---|---|---|---|
| 8,069,210 B2 | 11/2011 | Gillum et al. | |
| 8,762,298 B1 | 6/2014 | Ranjan et al. | |
| 10,623,429 B1 * | 4/2020 | Vines | H04L 63/1425 |
| 10,791,132 B1 * | 9/2020 | Power | H04L 63/0428 |
| 11,341,235 B2 * | 5/2022 | Jaenisch | H04L 63/1425 |
| 2014/0090059 A1 | 3/2014 | Wang et al. | |
| 2015/0264068 A1 | 9/2015 | Beauchesne | |
| 2015/0302090 A1 | 10/2015 | Jacob | |
| 2017/0111381 A1 * | 4/2017 | Jones | G06F 21/552 |
| 2018/0077180 A1 | 3/2018 | Zhang et al. | |
| 2018/0288126 A1 * | 10/2018 | Smart | H04L 69/22 |
| 2019/0044965 A1 | 2/2019 | Pilkington et al. | |

(Continued)

OTHER PUBLICATIONS

Haidar et al., "Website Navigation Behavior Analysis for Bot Detection," 2017 IEEE International Conference on Data Science and Advanced Analytics (DSAA) Year: 2017 | Conference Paper | Publisher: IEEE.*

(Continued)

*Primary Examiner* — Roderick Tolentino
(74) *Attorney, Agent, or Firm* — Rainier Patents, P.S.

(57) ABSTRACT

The present concepts relate to identifying entities based on their behavior using machine learning models. Where an entity may be a bot or a human, the entity's requests sent to a website are used to generate a graph. The graph may be used to create an image, such that the image reflects the entity's browsing behavior. A machine learning model, which has been trained using a first training set of images that correspond to bots and a second training set of images that correspond to humans, can determine whether the entity is a bot or a human by performing an image classification.

20 Claims, 7 Drawing Sheets

(56) References Cited

U.S. PATENT DOCUMENTS

| | | | |
|---|---|---|---|
| 2019/0137985 A1* | 5/2019 | Celia | G06V 10/82 |
| 2019/0207975 A1* | 7/2019 | Wardman | H04L 63/102 |
| 2019/0222589 A1* | 7/2019 | Kislitsin | H04L 63/0236 |
| 2020/0366689 A1* | 11/2020 | Lotia | H04L 63/1458 |
| 2021/0241068 A1* | 8/2021 | Foltin | G06N 3/10 |

OTHER PUBLICATIONS

Guidi et al., "Users and Bots behaviour analysis in Blockchain Social Media," 2020 Seventh International Conference on Social Networks Analysis, Management and Security (SNAMS) Year: 2020 | Conference Paper | Publisher: IEEE.*

"Akamai Bot Manager", Retrieved From: https://www.akamai.com/us/en/products/security/bot-manager.jsp#features, Feb. 16, 2019, 8 Pages.

"Block Bot Detection", Retrieved From: https://www.distilnetworks.com/block-bot-detection/, Jan. 2018, 15 Pages.

"Botnet Dataset", Retrieved From: https://www.unb.ca/cic/datasets/botnet.html, Jan. 2014, 6 Pages.

"CSIC 2010 HTTP Dataset in CSV Format", Retrieved From: https://petescully.co.uk/research/csic-2010-http-dataset-in-csv-format-for-weka-analysis/, Jan. 2009, 5 Pages.

"Detect Bots in Real-time with Shieldsquare Bot Mitigation Solution", Retrieved From: https://www.shieldsquare.com/bot-traffic-detection/, Retrieved Date: May 22, 2019, 6 Pages.

"Google Analytics", Retrieved From: https://marketingplatform.google.com/about/analytics/, Retrieved Date: May 22, 2019, 9 Pages.

"KDD Cup 1999 Data", Retrieved from: http://kdd.ics.uci.edu/databases/kddcup99/kddcup99.html, Retrieved Date: May 22, 2019, 1 Page.

"Sitemaps Protocol 0.84", Retrieved From: https://googlepress.blogspot.com/2006/11/major-search-engines-unite-to-support_16.html, Jun. 2005, 3 Pages.

Chen, et al., "Xgboost: A Scalable Tree Boosting System", In Proceedings of the 22nd ACM SIGKDD Conference on Knowledge Discovery and Data Mining., Aug. 13, 2016, 10 Pages.

Demartine, Amy, "The Forrester New Wave : Bot Management, Q3 2018", Retrieved From: https://www.forrester.com/report/The+Forrester+New+Wave+Bot+Management+Q3+2018/-/E-RES143516#, Sep. 20, 2018, 3 Pages.

Haidar, et al., "Website Navigation Behavior Analysis for Bot Detection", In Proceedings of IEEE International Conference on Data Science and Advanced Analytics (DSAA), Oct. 19, 2017, pp. 60-68.

Jaafar, et al., "Review of Recent Detection Methods for HTTP DDOS Attack", In Journal—Journal of Computer Networks and Communications, vol. 2019, Jan. 10, 2019, 11 Pages.

Kipf, et al., "Semi-Supervised Classification with Graph Convolutional Networks", In the Proceedings of 5th International Conference on Learning Representations, Apr. 24, 2017, 14 Pages.

Kudugunta, et al., "Deep Neural Networks for Bot Detection", In Proceedings of Computing Research Repository, Feb. 2018, 10 Pages.

Lagopoulos, et al., "Web Robot Detection in Academic Publishing", In the Repository of abs/1711.05098, Nov. 14, 2017, 7 Pages.

Luo, et al., "BotGraph: Web Bot Detection Based on Sitemap", In the Repository of arXiv:1903.08074, Mar. 26, 2019, 7 Pages.

Scholkopf, et al., "Support Vector Method for Novelty Detection", In Proceedings of the 12th International Conference on Neural Information Processing Systems, Jan. 1999, 7 Pages.

Shah, Harsh, "A Simple E-commerce Website Using Flask", Retrieved From: https://github.com/HarshShah1997/Shopping-Cart, Jan. 2016, 1 Page.

Verlet, Loup, "Computer Experiments on Classical Fluids. I. Thermodynamical Properties of Lennard-Jones Molecules", In the Journal of Physical review, vol. 159, Issue 1, Jul. 5, 1967, pp. 98-103.

Yuan, et al., "Deepdefense: Identifying DDOS Attack via Deep Learning", In Proceedings of IEEE International Conference on Smart Computing (SMARTCOMP), May 29, 2017, 8 Pages.

Zeifman, Igal, "Bot Traffic Report 2016", Retrieved Date: https://www.incapsula.com/blog/bot-traffic-report-2016.html, Jan. 24, 2017, 11 Pages.

Zenati, et al., "Efficient Gan-based Anomaly Detection", In Proceedings of 6th International Conference on Learning Representations, Apr. 30, 2018, 13 Pages.

Zhai, et al., "Deep Structured Energy Based Models for Anomaly Detection", In the Proceedings of Proceedings of the 33nd International Conference on Machine Learning, vol. 48, Jun. 19, 2016, 10 Pages.

Zong, et al., "Deep Autoencoding Gaussian Mixture Model for Unsupervised Anomaly Detection", In the Proceedings of 6th International Conference on Learning Representations, Apr. 30, 2018, 19 Pages.

* cited by examiner

| CLIENT | ENTITY TYPE | ACTION | |
|---|---|---|---|
| 142.88.36.244 | HUMAN | MORE INFO... | |
| 122.125.19.81 | HUMAN | MORE INFO... | BLACKLIST |
| 186.93.60.215 | BOT | MORE INFO... | |
| 119.55.179.8 | HUMAN | MORE INFO... | BLACKLIST |
| 203.142.36.94 | BOT | MORE INFO... | |
| 103.253.26.246 | HUMAN | | |

FIG. 4

BOT BEHAVIOR DETECTION

BACKGROUND

Detecting entities based on their identification signatures has drawbacks in that the identification signatures can be falsified. From detecting criminals at airports to detecting automated bots at websites, the detection of entities is a difficult and widespread problem.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

FIG. 4 shows an example graphical user interface, consistent with some implementations of the present concepts.

DETAILED DESCRIPTION

Overview

Figure 1:
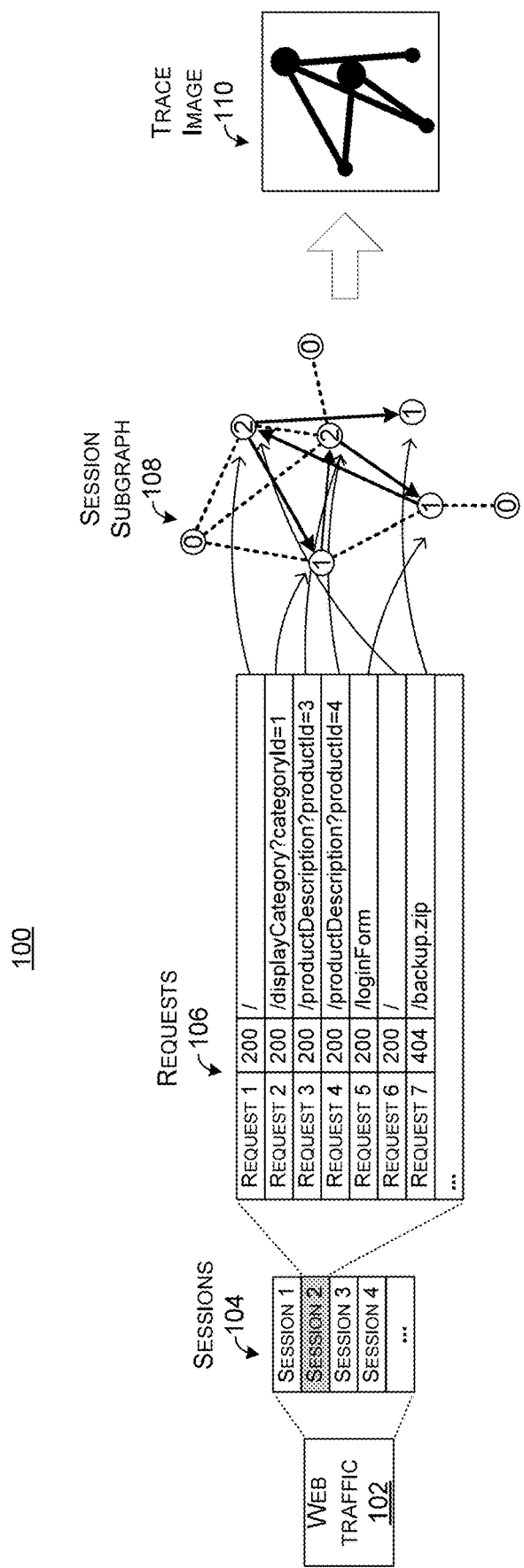
FIG. 1 shows an overview flow diagram of an example behavior detection scheme, consistent with some implementations of the present concepts.

The present concepts generally relate to identifying entities based on their behavior (i.e., actions) using artificial intelligence. That is, various characteristics of entities can be determined using machine learning models. Entities may include, for example, people, animals, computers, automobiles, storms, celestial objects, or any other entities that perform actions and thereby exhibit behavior patterns. Characteristics may include, for example, gender, age, race, preferences, social class, disability, religion, education, species, breed, hardware profile, software profile, etc., and may also include various groups of entities (e.g., humans versus computers).

In some implementations, a graph may be created based on the actions of an entity. Furthermore, the graph may be used to create an image, such that the image represents the entity's actions and thus reflects the entity's behavior. Accordingly, having derived an image that reflects the entity's behavior, the task of determining a characteristic associated with the entity has now become an image classification problem, which can be solved using a machine learning model. For example, the machine learning model may have been trained using datasets of training images that are associated with a plurality of entities with known characteristics are used as ground truths. Thus, the trained machine learning model can determine one or more characteristics of an entity by performing an image classification.

The present concepts may have a wide range of applications, so long there are distinguishable behavior patterns associated with entities of different characteristics, and sufficient training datasets are available. In one example application of the present concepts, a machine learning model may be used to distinguish between two groups of entities: (1) human web browser clients and (2) automated machine web browser clients (called bots). Bots have been a significant threat to the internet for some time. Bots can consume a large amount of internet traffic, overload computing resources, and undermine the interests of website operators whose websites are crawled and/or scraped by bots. More than half of all internet traffic may be the result of automated bots instead of humans. These bots may include search engine bots, price scrappers, email harvesters, and even trojans, which could launch distributed denial of service (DDoS) attacks. These malicious bots can not only consume significant bandwidth and cause server overload but also cause the leakage of sensitive business data.

Accordingly, bot detection services are highly demanded by both website owners and service providers. Unfortunately, the difficulty in detecting bots among humans has plagued website operators and internet service providers. Conventional bot detection techniques focus mainly on signature-based detection solutions. There are several conventional bot detection techniques that use, for example, user agent blacklists, internet protocol (IP) address rate limiting, device fingerprint recognition, geolocation information, bot signature databases, legitimate service whitelists, etc. However, maintaining an IP address blacklist or a user agent blacklist requires huge effort. Moreover, advanced bots can forge their identities by changing their signatures, and thereby bypass such conventional bot detection techniques. For example, a bot can easily use a proxy IP address or tamper with its user agent identification to that of a normal legitimate browser of a human user. Furthermore, device fingerprint detection, biometric data validation, and JavaScript™ engine validation usually rely on client-side software code, which is an invasive technique. Even these invasive bot detection techniques can be bypassed by advanced bots that use headless browsers as real browser environments. Accordingly, conventional bot detection methods that rely on bots' identities or feature codes can be easily bypassed by advanced bots that fake their identities.

Furthermore, as more businesses migrate their websites to the cloud, could service providers have a greater need and responsibility of offering effective bot mitigation solutions for their customers. With increasing cloud migration, cloud service providers have new opportunities for providing an effective bot detection ability based on big data of client behavior information. That is, the large amount of data on past client behavior of bots and humans available to cloud service providers can be used to train effective machine learning models or detecting bots. Since advanced bots can easily and frequently change their identities, there is a need for a bot detection scheme that leverages the clients' behavior instead of their identities as features.

Bot Detection

The present concepts relate to identifying entities (i.e., detecting one or more characteristics of entities) based on their behavior patterns using machine learning models. In one example application in the website security field, the present concepts relate to behavior-based bot detection schemes having improved detection capabilities over conventional signature-based detection schemes. Detecting bots based on their behavior instead of their identities (which can be fraudulently altered) would be better able to distinguish between bots and humans.

In some implementations, a sitemap graph of a website may be built. Then, a client session is mapped to a session subgraph of the sitemap graph. The session subgraph may contain information about which universal resource locator (URL) patterns the client has visited and corresponding access frequencies. Next, a two-dimensional monochromatic trace image may be generated from the session subgraph. Thus, the task of bot detection has become an image classification problem. Accordingly, a machine learning model, such as a deep learning model based on a convolutional neural network (CNN), may be used to classify the trace image into one of two categories: bot or human. This technique will be described in detail below with reference to the accompanying figures.

The present concepts therefore provide a novel scheme to describe a client's browsing behavior in a 2-dimensional image and then using an image classification method to determine whether the client is a bot or a human. Because the bot detection techniques consistent with the present concepts detect behavior patterns (rather than identity signatures) of bots, they can more effectively detect and mitigate unwanted bots, including advanced bots that can forge their signatures. For example, the present concepts describe techniques for detecting bots without relying on the IP address or the user agent features of clients.

FIG. 1 shows an overview flow diagram of an example behavior detection scheme 100, consistent with some implementations of the present concepts. Web traffic 102 for a website may be obtained to be analyzed. The web traffic 102 may include one or more sessions 104 by one or more clients that access the website. A session 104 may include one or more requests 106. The requests 106 may be sent by the client to the web server to perform certain actions on the website. Therefore, the requests 106 may reflect the client's behavior. Next, the requests 106 may be converted into a session subgraph 108. A sitemap graph of the website may be created ahead in order to create the session subgraph 108. A sitemap graph will be explained in detail below with reference with FIG. 2. The session subgraph 108 may be another representation of the client's actions and therefore reflect the client's behavior pattern. Then, the session subgraph 108 may be analyzed using a machine learning model to classify the client as either a bot or a human. In one example implementation, the session subgraph 108 may be used to create a trace image 110, which can turn a bot detection problem into an image classification problem. This process will be described in detail below with reference to FIG. 3. The trace image 110 may be analyzed by a machine learning model to classify the trace image 110 as either a bot or a human. This brief summary provides a high-level overview of some implementations of the present concepts. More details this scheme will be explained below.

Sessions and Requests

The web traffic 102 may be obtained from the web server that hosts the website. The web traffic 102 may be current web traffic provided in real time or they may be past web traffic stored in logs. For example, the web server may keep logs as records of the web traffic 102. The web traffic 102 may include communications between the web server and one or more clients that access the website. For example, the clients may send requests 106 to the web server in one or more sessions 104, and the web server may send responses to the clients. These clients may include bots and/or humans. The present concepts are directed to identifying whether a client is a bot or a human based on its behavior—in this case, web browsing actions reflected in the requests 106 sent to the web server.

Bots usually scrape the webpages of a website with a large number of requests. To detect such a behavior, the requests 106 in the web traffic 102 for a website may be partitioned into sessions 104. For instance, a session 104 may identify a unique client that accesses the website. The example in FIG. 1 shows that the web traffic 102 has been organized into Session 1, Session 2, Session 3, Session 4, and so on. These example sessions 104 may be associated with one or more clients. Each session 104 in the web traffic 102 may be selected to determine whether the associated entity is a bot or a human. In other implementations, only certain sessions 104 (e.g., the ones with many requests over a threshold number or the ones taking up a lot of bandwidth, etc.) may be selected.

A session 104 may include one or more hypertext transfer protocol (HTTP) requests 106 sent from the client to a web server hosting a website. For example, in FIG. 1, Session 2 includes Request 1 through Request 7, and so forth. In some implementations, the requests 106 in a session 104 may be ordered chronologically. A request 106 may contain one or more fields, such as a timestamp field for the date and time of the request 106, an HTTP method field for the HTTP request method (e.g., GET, POST, etc.), a request-URI (universal resource identifier) field for the path in the universal resource locator (URL), a status field for the HTTP status code (e.g., 200, 404, etc.), a host field for the host (i.e., the web server) identification, a user agent field for the client's user agent identification, and a client IP field for the client's IP address.

The example requests 106 included in FIG. 1 shows the request-URI field and the status field. In this example, the website may be an online shopping website (e-commerce website), and the client associated with Session 2 has sent at least seven requests 106 to the web server. In this example, the client first visited the home page via Request 1, viewed a product category page via Request 2, viewed a product description page via Request 3, viewed a product description page for another product via Request 4, visited a login page via Request 5, browsed to the home page again via Request 6, and tried to request the backup.zip file via Request 7 and failed.

Consistent with the present concepts, the fields in the requests 106 may be viewed as falling into one of two types of fields: identity fields and behavior fields. For example, identity fields may be used to identify the client and the server, such as the host field, the client IP field, and the user agent field. Behavior fields may be used to describe the behavior of the client, such as the request-URI field, the status field, and the timestamp field. Conventional bot detection and mitigation schemes, such as IP rate limiting and user agent blacklisting, use the identity fields. However, if advanced bots fake their identities, for example, using an IP proxy pool or tampering their user agent identifications, such conventional schemes can fail. The present concepts, on the other hand, can detect bots based on their behavior instead of their identities. In some implementations of the present concepts, the request-URI field and the status field may be used to describe client behavior and to detect bots as distinguished from humans.

Sitemap Graph

Figure 2:
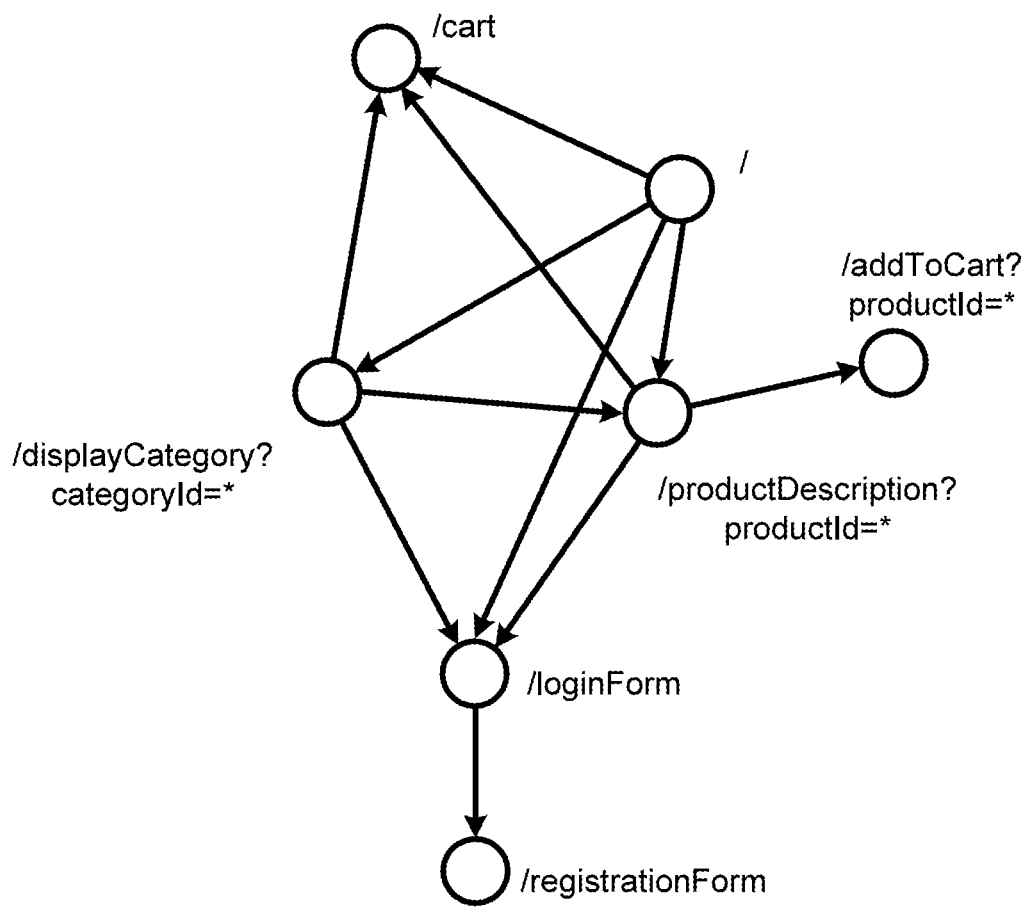
FIG. 2 shows an example sitemap graph, consistent with some implementations of the present concepts.

FIG. 2 shows an example sitemap graph 200, consistent with some implementations of the present concepts. The sitemap graph 200 may be a representation of the contents of a website. Creating the sitemap graph 200 may facilitate the generation of session subgraphs, which can be used to detect bots, based on the requests 106.

There may be many ways to create the sitemap graph 200 for a website. For example, the sitemap protocol allows a website's content to be described in a structured list (i.e., an extensible markup language (XML) file) that lists all the URLs for the website. In one example implementation, the list formatted sitemap may be converted into a graph format, where the sitemap graph 200 may be defined as G=(V,E), in which:

G is a directed graph.

V is a set of nodes (also called vertices). A node may represent a URL pattern incorporating multiple URLs. For example, both /page?id=1 and /page?id=2 may belong to the same URL pattern /page?id=* and thus belong to the same node.

E is a set of directed edges from one node to another. For example, if the HTML content of a webpage with URL pattern $v_1$ has one or more hyperlinks (typically via the HTML <a> tag) pointing to URL pattern $v_2$, then graph G would include a directed edge e from node $v_1$ to node $v_2$.

Many variations on definition and structure of the sitemap graph 200 may be possible, consistent with the present concepts. For example, the sitemap graph 200 may be an undirected graph. As another example, a node may be included for each URL rather than for each URL pattern.

The example of the sitemap graph 200 shown in FIG. 2 may be for an online shopping website. This sitemap graph 200 shows that the website includes several functionalities of online shopping, including registration, login, homepage, product views, shopping cart, etc.

A sitemap (e.g., the structured list in an XML format according to the sitemap protocol) for a website may be built in several different ways, including active crawling, passive sniffing, and self-providing. Active crawling may involve running an automated crawler on the website to build the sitemap of the website. The crawling may start from the homepage of the website and enter each hyperlink from the current page, and so on, recursively. This method may be intrusive but allows the generation of a complete and accurate sitemap for the website. A URL pattern may be retrieved only once to reduce the total number of pages that need crawling, assuming that webpages with the same URL pattern have the same page structure and similar hyperlinks of the same URL patterns. Passive sniffing may involve monitoring web traffic for the website, learning the URLs of the website from the sniffed traffic, and then building the sitemap from the URLs. Passive sniffing may be less intrusive than active crawling. However, a sitemap built through passive sniffing may be incomplete, because the breadth of the sitemap may be limited by the amount of sniffed traffic and the scope of webpages in the website that are actually accessed by client during the sniffing time period. Alternatively, the website owner (or designer or operator) may manually create a sitemap for the website. However, this method may require non-trivial work by the website owner to create and update the sitemap.

The sitemap graph 200 may then be generated for the website using the sitemap that was created using one of the three methods (active crawling, passive sniffing, or self-provided). For example, the traffic logs from a search engine website may include a PageName field (e.g., Home, Page.Serp, Page.NoResults, Page.Image.Results, etc.), which can be used to create the nodes in the sitemap graph 200. In another example, URL patterns in the request-URI field of the requests 106 may be used to create the nodes in the sitemap graph 200. For example, as shown in FIG. 2, the sitemap graph 200 may include a node representing the homepage that was created from the URL pattern "/", a node representing the shopping cart page that was created from the URL pattern "/cart", a node representing the login page that was created from the URL pattern "/loginForm", and so on.

In one implementation, the directional edges in the sitemap graph 200 may be created based on the existence of hyperlinks from one webpage to another webpage. This information may be gathered through active crawling, passive sniffing, or self-providing methods. In another implementation, the directional edges in the sitemap graph 200 may be created based on adjacent (i.e., sequential in time) requests that are sniffed in the web traffic or identified in traffic logs. In yet another implementation, a random set of edges may be generated to make most of the nodes connected in the sitemap graph 200. The edges in the sitemap graph 200 do not necessarily have to correlate with or dictate the edges in the session subgraph 108. That is, the edges in the sitemap graph 200 may be common to the website and may be used to calculate the position coordinates for the nodes in the sitemap graph 200 (and eventually the position coordinates for the spots in trace images 110). Whereas, the edges in the session subgraph 108 may be specific to a particular session 104 (and the requests 106 therein) and used as features to generate the lines in a trace image 110. Furthermore, the edges in the sitemap graph 200 may be uni-directional, bi-directional, and/or non-directional.

Session Subgraph

In some implementations of the present concepts, bots may be detected on a per-session basis. Accordingly, the requests 106 in the web traffic 102 for a website may be grouped into sessions 104, and the requests 106 in a particular session 104 may be sorted chronologically using the timestamp field in the requests 106.

Consistent with some implementations of the present concepts, a session subgraph 108 may be created based on the requests 106 in a particular session 104 for a client. As shown in FIG. 1, the request-URI field of the requests 106 in the session 104 can be mapped to the nodes in the session subgraph 108, which is a subgraph (a subset graph) of the sitemap graph 200. This may be one example of extracting behavior features from an entity's actions to generate a graph that reflects the entity's behavior, consistent with the present concepts.

The nodes in the session subgraph 108 may include access frequency values (or keys or attributes), which indicate the number of requests mapped to the nodes. Accordingly, if a particular webpage (or a URL pattern) is requested many times by the client in the session 104, the node in the sitemap graph 200 associated with the particular webpage may have a high access frequency value. The access frequencies for the URL patterns may be an important distinguishing feature of bots as they tend to access certain types of webpages more frequently than others. For example, a bot may repeatedly request voluminous amount of product information (i.e., /product?id=*) to scrape numerous product description webpages but never add a single product to a shopping cart or purchase a product by checking out.

The session subgraph 108 may include the nodes in the sitemap graph 200 that have been requested at least once, and may exclude the nodes in the sitemap graph 200 that have not been requested at all in the given session 104. For example, as shown in FIG. 1, Request 1 and Request 6 may both map to the node in the sitemap graph 200 that corresponds to the homepage, and therefore, that node is included in the session subgraph 108 with an access frequency value of 2. Request 3 and Request 4 may both map to the node in the sitemap graph 200 that corresponds to product description pages, and therefore, that node is included in the session subgraph 108 with an access frequency value of 2. Request 5 may map to the node in the sitemap graph 200 that corresponds to the login page, and therefore, that node is included in the session subgraph 108 with an access frequency value of 1. None of the requests 106 in this session 104 maps to the node in the sitemap graph 200 that corresponds to the shopping cart, and therefore, that node may not be included in the session subgraph 108.

Moreover, two adjacent requests 106 (i.e., consecutive in time) in the session 104 may be mapped to an edge in the session subgraph 108. For example, as shown in FIG. 1, the session subgraph 108 includes an edge from the node that correspond to Request 4 to the node that corresponds to Request 5. The edges in the session subgraph 108 may be non-direction, uni-directional, or bi-directional. Other implementations are also possible. For example, the edges in the session subgraph 108 may also include access frequency values (not shown in FIG. 1) reflecting the number of times the pair of consecutive requests 106 represented by a particular edge exists in the session 104. Accordingly, the present concepts provide an advantage in detecting bots over conventional bot detection techniques that do not consider or account for the relationships between the webpages visited by the clients.

There may be occasions in which the client tries to access non-existent URLs (e.g., by sending an invalid request to the web server) and the status code 404 is returned by the web server, as shown by Request 7 in FIG. 1. For example, this may occur when a bot attempts to access a previously crawled and cached URL which has since been removed from the website, or when a bot brute-force attacks against common vulnerable URLs like/backup.zip and/ apmserv5.2.6.rar, etc. Such invalid requests 106 may not map to any valid node in the sitemap graph 200. Therefore, an invalid node (i.e., a node called "INVALID") may be added to the session subgraph 108 and/or the sitemap graph 200 as a container of all non-existent URLs and/or invalid requests 106. The status field in the requests 106 may be used to determine whether the associated request-URI is a valid mapping. The invalid node in the session subgraph 108 may include an access frequency value that counts the number of invalid requests 106 in the session 104.

Through the above-described process, the mapped nodes and the mapped edges may form a subgraph of the full sitemap graph 200 of the website, the formed subgraph being the session subgraph 108. The session subgraph 108 therefore may contain information about the URL patterns the client has visited as well as the corresponding access frequencies. Accordingly, the session subgraph 108 may reflect the client's behavior.

Trace Image

To determine whether the client is a bot or a human based on the client's behavior, which is reflected in the session subgraph 108, the session subgraph 108 may be transformed into a trace image 110, such that the bot detection problem may become an image classification problem. There are many types, formats, and schemes that can be used to create trace images 110. In one implementation, trace images 110 may have a size of 256 pixels by 256 pixels. Any other size and dimensions may be selected for the trace images 110. Consistent with some implementations of the present concepts, trace images 110 may include elements (e.g., shapes, lines, connectors, etc.) having features (e.g., positions, sizes, colors, patterns, connections, etc.) that vary with the client's behavior (which may be reflected in the session subgraph 108). In some implementation, a trace image 110 may include two kinds of elements: spots and lines. For example, the trace image 110 may include a circular spot for each node in the session subgraph 108 and may also include a line for each edge in the session subgraph 108. The features of the spots and the lines in the trace image 110 may be dependent on the nodes and the edges, respectively, in the session subgraph 108 (e.g., the access frequency values).

In some implementations of the present concepts, the Verlet algorithm may be used to generate the coordinates for the spots in the trace image 110 (i.e., to determine the positions for the nodes in the session subgraph 108). The Verlet algorithm has been used to perform molecular dynamics simulations based on Newton's equations of motion. The Verlet algorithm can be used for the present concepts by assuming that the nodes in the sitemap graph 200 are molecular particles and also assuming that an edge between two nodes in the sitemap graph 200 generates an attractive force between the two connected nodes. As such, two connected nodes (i.e., two nodes having an edge in between them) tend to gravitate towards each other compared to two unconnected nodes (i.e., two nodes that do not have an edge between them). Therefore, the Verlet algorithm may use an iterative formula to reach a final balanced state for all the nodes in the sitemap graph 200 and thus provide position coordinates for all the nodes. For example, the visual depiction of the sitemap graph 200 in FIG. 2 is consistent with the position coordinates that the Verlet algorithm would have generated using the nodes and the edges in the sitemap graph 200. As can be seen in FIG. 2, the nodes that are well connected with many edges (such as the homepage node, the shopping cart node, product category node, product description node, and the login page node) are clustered close to one another, while the nodes that are less connected with fewer edges (such as the add-to-cart node and the registration node) are on the outskirts of the graph.

To increase efficiency, the position coordinates for all the nodes in the sitemap graph 200 may be generated only once using the Verlet algorithm, and those position coordinates can then be user and shared to generate multiple trace images 110 that may be derived from multiple session subgraphs 108, which are subsets of the sitemap graph 200. Alternatively, the Verlet algorithm may be applied for each separate instance of generating a trace image 110 from a session subgraph 108. In certain implementations where the invalid node is not included in the sitemap graph 200, the position coordinates for the invalid node may be set using any method, for example, a random selection, running the Verlet algorithm assuming the invalid node is part of the sitemap graph 200 connected to any of the other nodes, or running the Verlet algorithm on the first session subgraph 108 to obtain the position coordinates for the invalid node and then reusing those position coordinates for all other session subgraphs 108.

The access frequencies associated with the nodes and/or the edges in the session subgraph 108 may affect the trace image 110 in a variety of ways. For example, in one implementation, the radius of a spot in the trace image 110 may depend on the access frequency of the associated node in the session subgraph 108, while the color of the spot remains a constant black. In another implementation, the access frequency associated with the nodes in the session subgraph 108 may dictate the color or shade (e.g., the darkness in a gradient from white to gray to black) of the spots in the trace images 110, while the radius of the spots remains constant. In another example, the access frequency associated with the edges in the session subgraph 108 may dictate the color and/or the thickness of the lines in the trace images 110. In another example, the direction of the edges in the session subgraph 108 may affect the color or shade of the lines in the trace images 110. For example, a line in a trace image 110 may start with a light shade and end with a dark shade in the direction of the corresponding directional edge in the session subgraph 108. In another example, a line in a trace image 110 may start thin and end thick in the direction of the corresponding directional edge in the session subgraph 108. Alternatively, the thickness of the edges in the trace images 110 may be a constant thickness. For example, the trace image 110 shown in FIG. 1 is monochrome, the lines have a constant thickness, and the radii of the spots vary depending on the access frequency of the nodes in the session subgraph 108. Other ways of incorporating the access frequencies associated with the client's behavior into the trace image 110 are possible.

In the implementations where the radius of a spot in a trace image 110 represents the access frequency associated with the corresponding node in the session subgraph 108, a function for the radius may be defined. For example, according to some implementations, the radius of a spot may be defined as $r=f(x)$, where r is the radius of the spot, x is the access frequency of the corresponding node, and $f(x)$ is a function that satisfies the following criteria:

Higher access frequencies may correspond to larger radii. Thus, $f(x)$ may be an increasing function.

The smallest size spot that corresponds to a node having the lowest frequency of being requested only once (i.e., x=1) should be visible or detectable in the trace image. Thus, a minimum radius may be set as $f(1)=r_{min}$. For example, the $r_{min}$ may be set such that the smallest spot is largest than the thickest edge (or the constant thickness for edges) so that all spots stand out among the edges.

The largest size spot that corresponds to a node having the highest frequency should not occupy too much space in the trace image. Thus, a maximum radius may be set as $f(+\infty)=r_{max}$.

The gradient of $f(x)$ may be gentle when x is relatively small. That is, the derivative of $f(x)$ may be near static when x is small. Thus, the radius may be restricted using a gate function $f(x_{gate})=r_{gate}$, where the gate is a chosen value.

In some implementations, a sigmoid function that satisfies the above criteria may be used to calculate the radius.

$$f(x) = \frac{c}{1 + e^{b-a \cdot x}} \quad \text{Equation 1}$$

Given $r_{min}$, $r_{max}$, $x_{gate}$, and $r_{gate}$, parameters a, b, and c may be determined by solving the above-listed criteria. In one implementation, the following variables may be set as: $r_{min}=4$, $r_{max}=80$, $x_{gate}=50$, and $r_{gate}=50$. If $r_{min}=4$, then $f(1)=4$, and if $r_{max}=80$, then $f(+\infty)=80$. Accordingly, there are three equations and three variables a, b, and c. Accordingly, three parameters a, b, and c of the radius function $f(x)$ may be solved using the three equations.

Other formulas for using the access frequencies associated with nodes and/or edges in the session subgraph 108 to affect the trace image 110 are possible, consistent with the present concepts. For example, a formula may determine the color or the shade of the spots in the trace image 110 based on the access frequencies associated with the nodes in the session subgraph 108. One or more formulas may determine the color, the shade, and/or the thickness of the lines in the trace image 110 based on the access frequencies associated with the edges in the session subgraph 108.

Optionally, a padding of about 5% (or 13 pixels when using 256×256 image size) may be added to the four sides of the trace images 110 to minimize the occurrences of large spots centered at or near the boundary of a trace image 110 running off the canvas. To ensure that no part of a spot extends beyond the boundary of a trace image 110, a padding equal to $f(r_{max})$ (or the pixel equivalent thereof for a 256×256 image) may be added to the four sides of the trace images 110. Alternatively, a margin or a border of about 5% thickness may be defined at the outermost regions on the four sides of the trace images 110, such that the centers of the spots will be positioned in the inner parts of the trace images 110 rather than within the outer margins.

Machine Learning Model

Consistent with the present concepts, a machine learning model may be trained to identify certain characteristics of entities based on their behavior. In some implementations, a corpus of training datasets containing images reflecting bot behavior and images reflecting human behavior may be used to train a machine learning model to detect bots by classifying an input image. For example, a corpus of training datasets may be obtained from real world web server logs (provided by, for example, web server providers and/or web browser providers) from various types of websites, such as search engines, news, universities, retailers, etc. For instance, a training set of web traffic logs from a search engine may be collected for a couple of hours or several days. Large amounts of web traffic logs are becoming more readily available through the ongoing migration to cloud computing.

The training logs may be sessionized (i.e., the requests may be divided and grouped into sessions) by tracking the SessionID cookies of the clients. In some implementations, certain sessions may be removed from the training datasets. For example, sessions that include only one request (i.e., only one node in the session subgraph and only one spot in the trace image) may be excluded, because such sessions are not helpful in training the machine learning model and not helpful in detecting bots. A higher limit (e.g., a minimum of three requests, nodes, or spots) or any other criteria may be used to filter the sessions in the training set. If the number of spots in a trace image is small (e.g., fewer than three spots), then bot detection may be more difficult, because bots and humans are more likely to behave similarly when browsing only one or two webpages. Although excluding sessions with only one or two requests from the training set may hinder the detection of bots that visit only one or two webpages, such bots are relatively benign and the failure to detect such bots may not pose a substantial disadvantage. In other words, the inability to detect bots that submit only a few requests may not be very detrimental considering that malicious bots are harmful largely due to their large amount of traffic caused to the web server. Bots that make only one or two requests in total are unlikely to seriously harm the web server.

Each session in the training datasets may be labeled as a bot or a human. The labeling may be performed based on known bots and/or known humans that were used to create the training datasets. For example, a group of human testers may be employed to browse the website for a period of time while their requests are logged and collected to generate the training datasets labeled as human. Additionally, a set of bots may be purposefully deployed to crawl and/or scrape the website for a period of time while their requests are logged and collected to generated the training datasets labeled as bots. In other implementations, real life web traffic from unknown clients may be manually analyzed by a team of engineers using various techniques, including JavaScript™ support checking, mouse movement, click tracking, IP reputation, user agent blacklists, etc., to label the sessions in the traffic as bots or humans. The labels may be assumed to be correct and used as ground truth in training the machine learning model. Additionally, training datasets of bots may be obtained from real life web traffic based on the user agent identifications. Although a bot can easily falsify its user agent identification to mimic a normal browser, a client with a user agent identification that claims to be a bot is very likely to be an actual bot. Accordingly, requests from clients whose user agent identifiers claim to be known bots may be used as training datasets and be labeled as bots.

Figure 3:
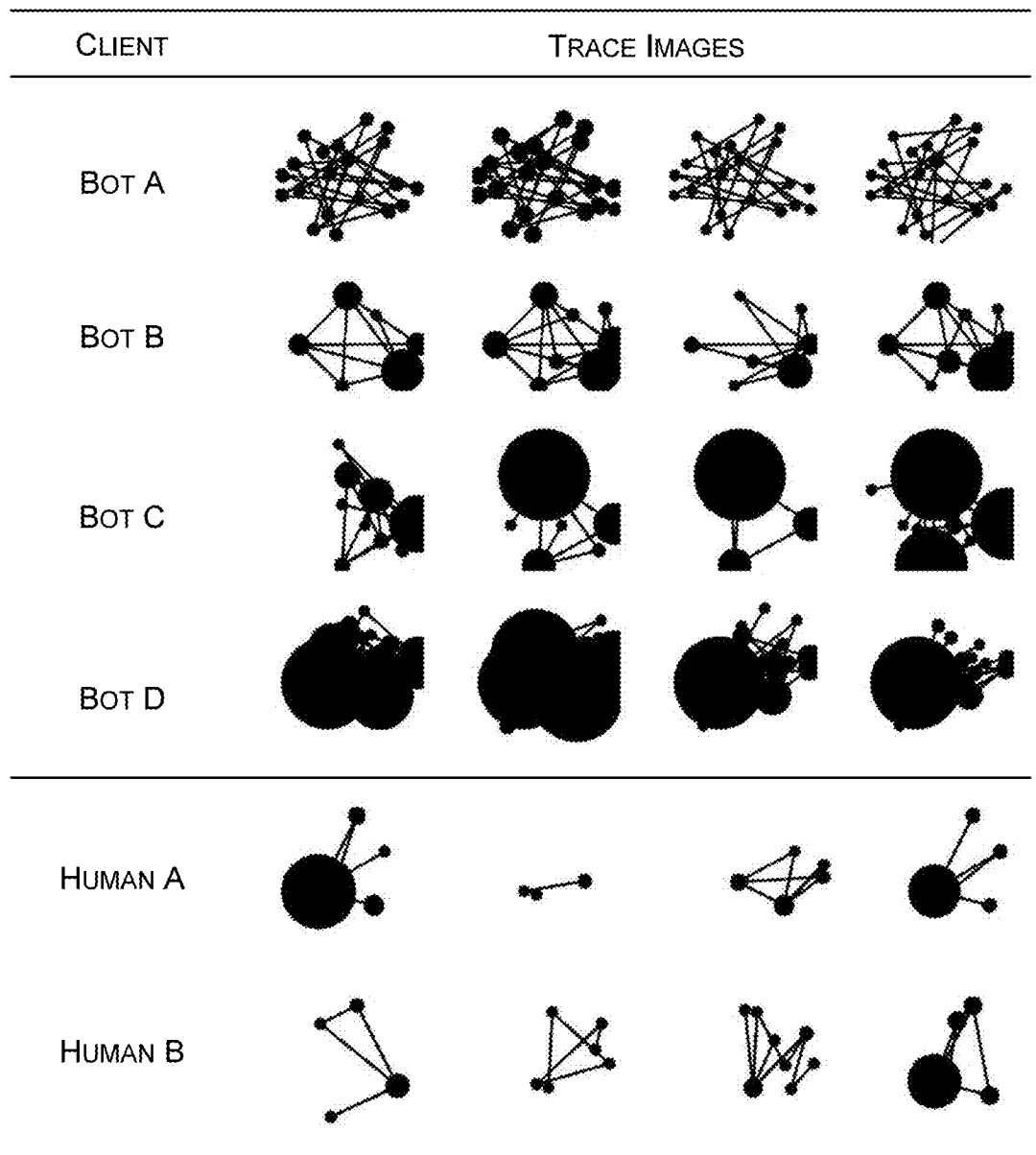
FIG. 3 shows example trace images, consistent with some implementations of the present concepts.

FIG. 3 shows example training trace images of bots and humans, consistent with present concepts. For example, FIG. 3 shows four trace images corresponding to four sessions resulting from each of Bot A, Bot B, Bot C, and Bot D browsing a website. FIG. 3 also shows four trace images corresponding to four sessions resulting from each of Human A and Human B browsing the website. As illustrated, various trace images of the same bot share a high degree of similarity, while trace images of different bots have distinct image patterns, because the same bot exhibits similar behavior even during different sessions. Moreover, the trace images of human clients have different shapes reflecting different behavior patterns, which would be distinguishable from the trace images of bots by a machine learning model that has been trained using distinct sets of training trace images for bots and humans. For example, the session lengths (i.e., the number of requests) for bot clients (especially the more malicious bots like Bot C and Bot D) may be on average larger than the session lengths of human clients. Therefore, when the presence of bots is significant in a web traffic, this behavior pattern or characteristic of bots may be detected. However, some bots may be unorganized (i.e., the bot traffic is scattered and the corresponding trace image has no stable pattern), may have no harmful intentions, and may not crawl a very large number of web pages in a session (i.e., fewer and smaller spots in trace images). Although such bots may be harder to detect since their behavior is not as significantly distinguishable from human behavior, this may not be a great detriment since such bots may be benign.

In some implementations consistent with the present concepts, a machine learning model that classifies images may include a CNN, such as LeNet-5, AlexNet, ResNet, etc. Other types of deep learning models can also be used with the present concepts. For instance, a 7-level LeNet-5 CNN model using a batch size of 64, epoch of 100, learning rate of 0.01, and stochastic gradient descent (SGD) momentum of 0.5 may be trained using the training datasets and then used to classify the trace images 110 to detect bots. That is, a trace image 110 may be used as an input to the machine learning model, and the machine learning model may output a scalar, indicating bot or human. For example, the machine learning model may output a Boolean result, where a true result means that the client is a bot and a false result means that the client is not a bot. Alternatively or additionally, the machine learning model may output a confidence score or value indicating the likelihood that the client is a bot.

Graphical User Interface

FIG. 4 shows an example graphical user interface (GUI) 400, consistent with some implementations of the present concepts. The GUI 400 may be presented to a user to indicate one or more characteristics of entities that were detected using the present concepts. For example, the GUI may be a web browser as in shown in FIG. 4 or a standalone application. The GUI 400 may be presented to, for example, a website operator to show any bots detected on the website. In some implementations, the GUI 400 may include a listing of entities, e.g., a listing of web clients in this example. The clients may be identified by IP addresses, user IDs, or any other identifications. The listed clients may include real time clients that are currently accessing the website (i.e., their sessions are still alive). The listed clients may include past clients pulled from the web traffic logs who previously accessed the website. The GUI 400 shows six clients for illustration purposes, but the number of displayed clients is variable. For example, a large number of clients could be listed in the GUI 400 using a scrollable display window having a scroll bar and scroll buttons.

The GUI 400 may also identify one or more characteristics of the entities. In this example, the GUI indicates whether the clients are detected as being bots or humans. Such bot-or-human determinations may be the results of image classifications performed by a machine learning model, consistent with the present concepts, when trace images corresponding to the listed clients were input into the machine learning model. Many other information (not shown in FIG. 4) relating to the listed clients may be displayed to the user in the GUI 400, including, for example, the user agent field, geographical location, past browsing sessions and histories, the size of data downloaded from the website, the number of requests submitted to the website, etc. Furthermore, confidence scores (e.g., ranging from 0% to 100%) associated with the bot-or-human determinations may be displayed in correspondence with the listed clients. The confidence scores may be obtained from the outputs of the machine learning model, indicating the levels of confidence of the image classifications.

The GUI 400 may enable the user to sort the listing of clients. For example, the user may click on the "Entity Type" column header to sort the listed clients based on whether they are identified as bots or humans. In some implementations, the GUI 400 may enable the user to perform one or more actions based on the bot-or-human determinations. For example, a button may be presented next to each client that presents more information about the client. For example, any or all of the information described above (e.g., the user agent field, geographical location, past browsing sessions and histories, the size of data downloaded from the website, the number of requests submitted to the website, etc.) may be displayed on the GUI 400 windows shown in FIG. 4, or they may be presented when the user clicks on the "More Info" button.

In some implementations, a button for blacklisting a client may be presented to the website owner. This button may be available for all clients or only the clients that have been determined as bots, as shown in FIG. 4. The blacklist button, for example, may add the client to a maintained list of clients who will be prevented from visiting the website. That is, additional requests submitted by the client may be blocked or ignored. If the user presses the blacklist button on a current client, the client may be booted off the website immediately. Additionally, clients that have been manually blacklisted by the user and their corresponding trace images 110 may be used as ground truths to further train the refine the machine learning model. Accordingly, the training of the machine learning model may be an ongoing continual process.

Consistent with the present concepts, various others techniques may be used to inform the user that one or more clients are bots. For example, on-screen notifications, a pop-up alert, email notifications, text messages, sound alerts, or any other means of transmitting the outputs from the machine learning model to the user may be implemented.

Methods

Figure 5:
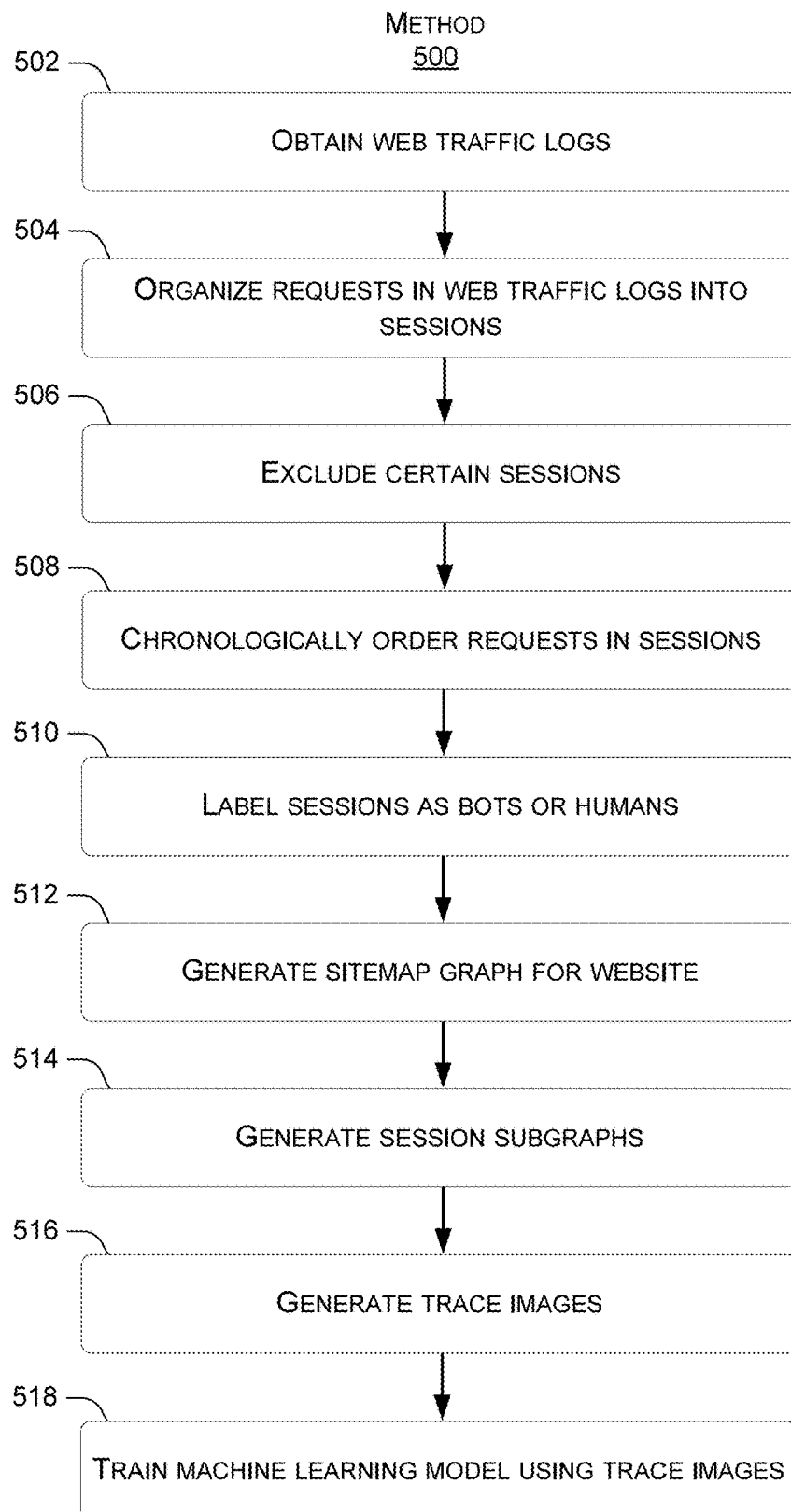
FIG. 5 shows a flowchart of an example bot detector training method, consistent with some implementations of the present concepts.

FIG. 5 shows a flowchart of an example bot detector training method 500, consistent with some implementations of the present concepts. In act 502, a corpus of training datasets containing web traffic logs may be obtained or accessed. The training datasets may include web traffic logs resulting from actions by bots and web traffic logs resulting from actions by humans. In act 504, the training datasets may be organized into sessions that include requests. In act 506, certain sessions may be optionally excluded from the training datasets. For example, any sessions that may not be helpful in training a machine learning model to distinguish between bot clients and human clients, such as sessions with only one or two request patterns, may be filtered out of the training datasets. In act 508, the requests in the sessions may be ordered chronologically. In act 510, the sessions and/or the requests therein may be labeled as bots or humans, depending on the type of client that the sessions are associated with.

In act 512, a sitemap graph of the website may be generated. The information required to generate the sitemap graph may be obtained by actively crawling the website, passively sniffing the web traffic, and/or manually creating it by a website designer. In act 514, session subgraphs may be generated for the sessions in the training datasets. In act 516, trace images may be generated for the session subgraphs. In act 518, a machine learning model may be trained using the trace images (i.e., the set of trace images corresponding to sessions labeled as bots and the set of trace images corresponding to sessions labeled as humans) as ground truths.

The acts in the bot detector training method 500 may be performed concurrently or in a different order than the presented order. Furthermore, many variations on the described acts may be possible. For example, the sitemap graph of the website may be generated (described in act 512) before or at the same time the corpus of training datasets containing web traffic logs is obtained (described in act 502). As another example, certain sessions containing fewer than three requests may be filtered out (as described in act 506), or certain session subgraphs containing fewer than three nodes (i.e., fewer than three URL patterns) may be filtered out.

Figure 6:
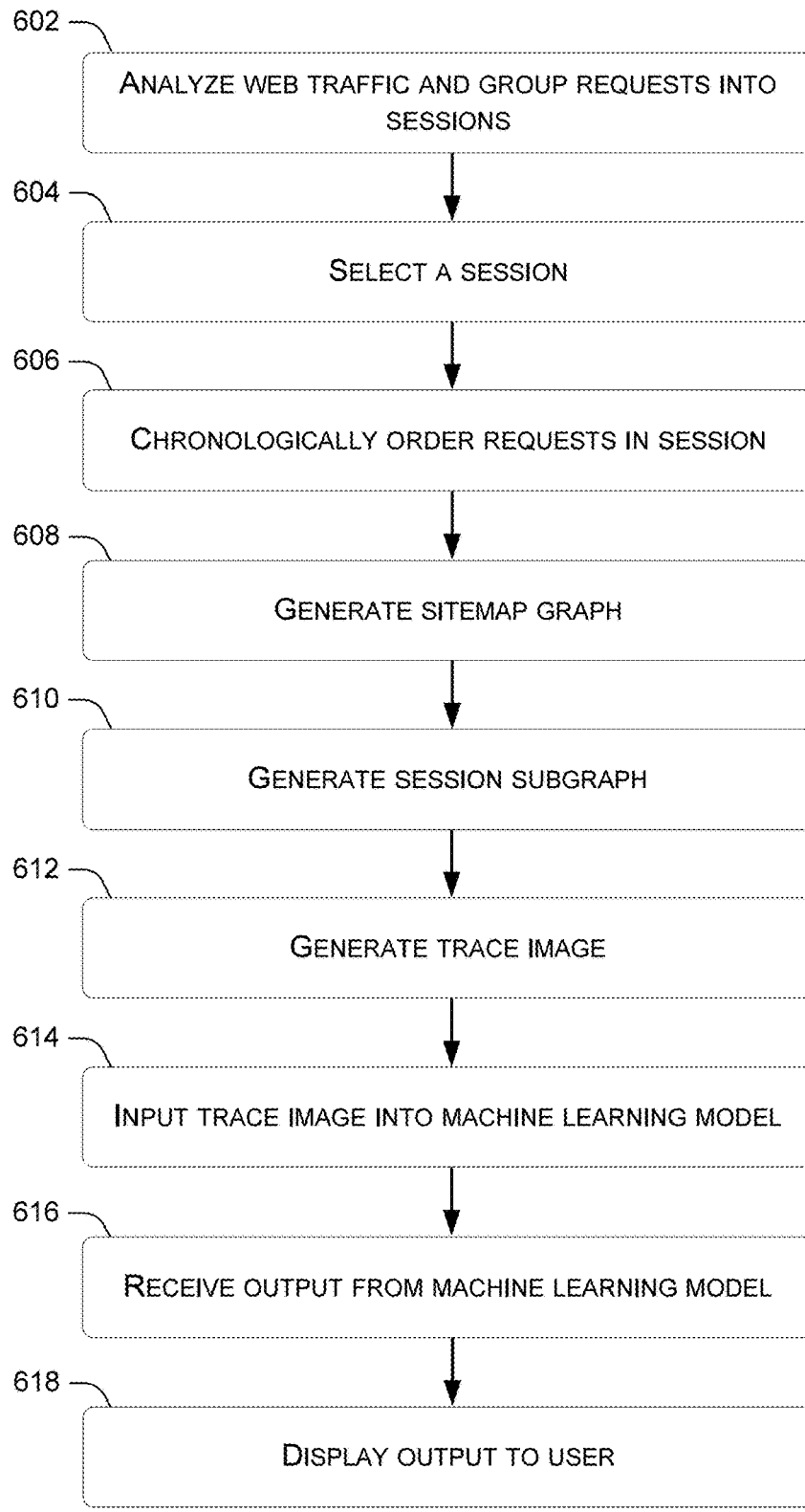
FIG. 6 shows a flowchart of an example bot detection method, consistent with some implementations of the present concepts.

FIG. 6 shows a flowchart of an example bot detection method 600, consistent with some implementations of the present concepts. In act 602, web traffic for a website that contains various requests from various clients may be analyzed, such that the requests are grouped into sessions. In act 604, one of the sessions associated with a particular client may be selected for determining whether the client is a bot or a human. In act 606, the requests in the selected session may be ordered chronologically.

In act 608, a sitemap graph of the website may be generated. Act 608 may be performed similar to act 512 described above. Alternatively, act 608 may be skipped if the sitemap graph of the website has already been generated in act 512.

In act 610, the requests in the session may be used to generate a session subgraph. In act 612, the session subgraph may be used to generate a trace image. In act 614, a machine learning model may receive the trace image as input. The machine learning model may have been trained using the bot detector training method 500 described above. In act 616, the machine learning model may output an indication that the client is a bot or a human. In act 618, the output (i.e., the determination by the machine learning model) may be displayed to a user in a GUI.

The acts in the bot detection method 600 may be performed concurrently or in a different order than the presented order. Furthermore, many variations on the described acts may be possible. For example, the requests in each session may be sorted in chronological order when the requests in the web traffic log are grouped into sessions.

The described methods, including the bot detector training method 500 and the bot detection method 600, can be performed by the systems and/or elements described above and/or below, and/or by other devices and/or systems. The methods, in part or in whole, can be implemented on many different types of devices, for example, by one or more servers; one or more client devices, such as a laptop, tablet, or smartphone; or combinations of servers and client devices. The order in which the methods and the acts thereof are described is not intended to be construed as a limitation, and any number of the described acts can be combined in any order to implement the methods, or alternate methods. Furthermore, the methods can be implemented in any suitable hardware, software, firmware, or combination thereof, such that a device can implement the methods. In one case, the methods may be stored on one or more computer-readable storage media as instructions (e.g., computer-readable instructions or computer-executable instructions) such that execution by a processor of a computing device causes the computing device to perform the methods. The described methods are mere example implementations of the present concepts. Other variations and different methods may be implemented, consistent with the present concepts. For example, an entity's actions (e.g., browsing requests) may be converted directly into a 2-dimensional image (i.e., without generating an intermediary graph) using a common scheme for the bot detector training method 500 and the bot detection method 600.

Example System

Figure 7:
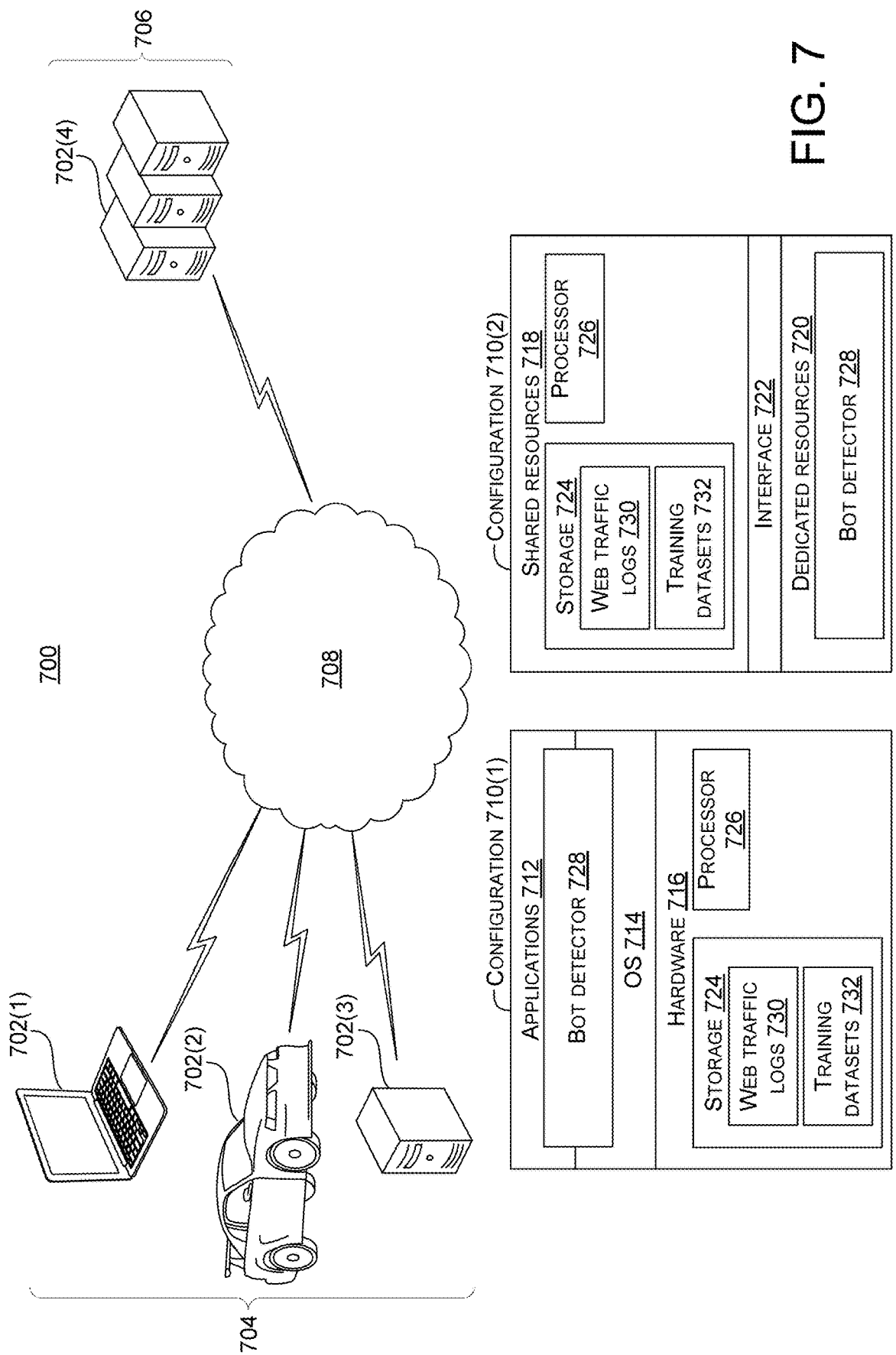
FIG. 7 shows an example system in which some implementations of the present concepts may be used.

FIG. 7 shows an example system 700 in which some implementations of the present concepts may be used. For purposes of explanation, the example system 700 includes devices 702. Examples of devices 702 can include traditional computing devices, such as personal computers, desktop computers, servers, notebook computers, cell phones, smart phones, personal digital assistants, pad type computers, mobile computers, cameras, appliances, smart devices, IoT devices, vehicles, etc., and/or any of a myriad of ever-evolving or yet to be developed types of computing devices.

In the example shown in FIG. 7, the devices 702 may include a laptop 702(1), a vehicle 702(2) (or a computer system in a vehicle), and a computer device 702(3) (e.g., a desktop personal computer or a server computer device), and a server device 702(4) (or a collection of servers). For purposes of explanation, devices 702(1)-702(3) can be viewed as being client-side or entity-side devices 704, and device 702(4) can be viewed as being a server-side device 706 (or cloud-based resource). The number of devices and the client-versus-server side of the devices described and depicted are intended to be illustrative and non-limiting. The devices 702 can communicate one another via one or more networks 708 and/or can access the Internet over the networks 708.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

Each client-side device 704 may be an entity, be used by an entity, and/or detect actions of an entity whose characteristics can be determined by the bot detector training method 500 and/or bot detection method 600 based on the entity's behavior. For example, a human entity may use the laptop 702(1) to browse a website hosted by the server-side device 706. A human driver or an autonomous driver-less computer may operate the vehicle 702(2) that is monitored by a traffic monitoring system run by the server-side device 706. A bot may be running as a program on the computer device 702(3) to crawl and/or scrape a website hosted by the server-side device 706.

The server-side device 706 may perform the bot detector training method 500 and/or the bot detection method 600. These methods may be performed on the same server-side device 706 or on different devices. These methods may be performed on the same server-side device 706 that hosts the website or be performed on a different device. Furthermore, any or all of the acts in the bot detector training method 500 and/or the bot detection method 600 may be distributed among a plurality of devices 702. For example, the described functionalities may be distributed among two or more devices 702 and may be distributed among client devices 704 and server devices 706. For example, the bot detector training method 500 may be performed by the server-side devices 706, and the bot detection method 600 may be performed by client-side devices 704. One or more devices 702 may perform various combinations of acts in methods 500 and 600. The specific examples of described implementations should not be viewed as limiting the present concepts.

FIG. 7 shows two device configurations 710(1) and 710(2) that can be employed by any or all of the devices 702. Individual devices 702 can employ either of the configurations 710(1) or 710(2), or an alternate configuration. One instance of each configuration 710 is illustrated in FIG. 7. Briefly, device configuration 710(1) may represent an operating system (OS) centric configuration. Configuration 710(2) may represent a system on a chip (SOC) configuration. Configuration 710(1) can be organized into one or more applications 712, operating system 714, and hardware 716. Configuration 710(2) may be organized into shared resources 718, dedicated resources 720, and an interface 722 there between.

In either configuration 710, the device 702 can include a storage 724 and a processor 726. The device 702 can also include a bot detector 728. The bot detector 728 can include and/or access web traffic logs 730 and training datasets 732 in the storage 724. The web traffic logs 730 may be used to create the training datasets 732. The training datasets 732 may be used to train the bot detector 728, for example, using the bot detector training method 500. The bot detector 728 may detect characteristics of entities, for example, detect bots using the bot detection method 600.

As mentioned above, configuration 710(2) can be thought of as a system on a chip (SOC) type design. In such a case, functionality provided by the device can be integrated on a single SOC or multiple coupled SOCs. One or more processors 726 can be configured to coordinate with shared resources 718, such as storage 724, etc., and/or one or more dedicated resources 720, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Other Applications

Although the present concepts have been described in detail above with respect to the example context of bot detection, as mentioned before, the present concepts have a wide range of applications for determining any characteristics of any entities based on their behavior. So long as sufficient training datasets are available that include behavior patterns (e.g., sequences of actions) of entities, where the behavior patterns can be represented in an image format (or represented in a graph format and then converted into an image format), then a machine learning model may be trained using the training datasets as ground truths to determine one or more characteristics of entities.

For example, various characteristics (e.g., age, gender, wealth, preferences, etc.) of online shoppers may be determined using the present concepts so long as sufficient training datasets can be collected from the behavior patterns of past online shoppers when browsing an online shopping website. For instance, elderly shoppers who frequency shop for canes, walkers, adult diapers, reading glasses, and large-print books may be distinguishable from young adult shoppers who frequency shop for latest pop music, concert tickets, and extreme sports equipment using the present concepts by formulating a scheme to generate graphs and/or images that reflect their behavior.

As another example, criminals (such as hijackers or bombers) and legitimate travelers may be distinguished based on their behaviors at airports. For instance, their actions may be tracked using a network of security cameras at an airport. A graph and/or an image may be generated based on a traveler's locations within the airport (e.g., waiting areas, restrooms, smoking areas, ticket counters, security screening areas, restaurants, baggage claim areas, etc.), how much time the traveler spends at the various locations, the number of companions with the traveler, how much the traveler converses, the number and size of bags the traveler is carrying, facial expressions of the traveler, etc. Ground truth training datasets of known past criminals may be obtained from recorded security camera footages. So long as the distinct behavior patterns of criminals and non-criminals can be reflected in distinguishable image patterns, a machine learning model can be trained to determine the different entities, consistent with the present concepts.

As another example, vehicles driven by human drivers and autonomous driverless vehicles may be distinguished based on their driving behaviors (e.g., locations visited, speed, number of lane changes, acceleration rate, rolling stops, etc.). For instance, the nodes in the graphs may represent points of interests (e.g., street intersections) on a map of a city; the edges in the graphs may represent roads or paths between the points of interests; the number of visits to the points of interests and/or the time or date when the points of interests were visited may determine the shape, size, color, and/or shade of the spots in the images; and the speed of travel, the number of lane changes, and/or the acceleration rate may determine the shape, thickness, color, and/or shade of the lines in the images. So long as the distinct behavior patterns of human drivers versus machine drivers can be reflected in distinguishable image patterns, a machine learning model can be trained to determine the different entities, consistent with the present concepts.

As another example, legitimate software applications and malicious malware applications (e.g., viruses and trojans) may be distinguished based on their runtime behavior rather than relying on digital signatures of applications and virus signature databases. For instance, an application's runtime behavior (e.g., files, directories, registries, settings, and configurations accessed; the number, frequency, type, and locations of files created and/or deleted; processing and/or memory resources used; remote computers contacted; the number of running processes; the frequency of restarts; etc.) can be represented by a graph and then converted into an image. If a machine learning model can be trained using runtime actions of known legitimate software applications as well as runtime actions of known malware applications, then the machine learning model can determine whether an unknown application is legitimate or malicious based on the application's runtime behavior rather than relying on any signatures.

The present concepts can be used to detect any characteristics of any entities so long as a consistent scheme is used to capture the entities' action into an image format when creating training datasets for a machine learning model and is also used to create an input image for using the machine learning model to identify some characteristics of a particular entity. For more examples, animals in the wild (having distinct movement patterns, eating habits, sleeping schedules, etc.), fish in the sea (having distinct migration patterns, groups of predators and preys, depth of habitat, etc.), celestial objects in space (having distinct trajectory, velocity, mass, density, radiation, etc.), storms in the atmosphere (having distinct movement patterns, speed, humidity, temperature, altitude, etc.), and virtually any entity that performs actions and whose distinguishable behavior patterns can be represented in image format can be detected using the present concepts.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A system, comprising:
a processor; and
storage having instructions which, when executed by the processor, cause the processor to:
  access a web traffic log including requests sent from a client to a web server to access a web site hosted by the web server;
  generate an image based at least on the requests, the image including a set of spots and a set of lines, the set of spots having positions and sizes that depend on the requests;
  classify the image into a bot category or a human category using a machine learning model having been trained using a first set of training images of known bot clients whose behavior patterns are different from known human clients and a second set of training images of the known human clients having distinct image patterns, reflecting different behavior patterns, compared to the first set of training images of the known bot clients;
  determine whether the client is a bot or a human based at least on whether the image is classified into the bot category or the human category; and
  block additional requests received from the client to the web server in response to determining that the client is a bot.

2. The system of claim 1, wherein the image is generated based at least on the requests by:
generating a graph based at least on the requests; and
generating the image based at least on the graph.

3. The system of claim 2, wherein:
the graph comprises:
  a set of nodes representing the requests; and
  a set of edges between the set of nodes, the set of edges representing adjacent requests;
  the set of spots in the image represents the set of nodes in the graph; and
  the set of lines in the image connects the set of spots, the set of lines representing the set of edges in the graph.

4. The system of claim 1, wherein the first set of training images is generated from a first training set of requests received by the web server from the known bot clients and the second set of training images is generated from a second training set of requests received by the web server from the known human clients.

5. The system of claim 1, wherein the machine learning model includes a convolutional neural network.

6. The system of claim 1, wherein the sizes of the set of spots are based at least on access frequencies associated with corresponding requests.

7. A computer-readable storage medium storing instructions which, when executed by a processor, cause the processor to:
generate an image including spots and lines whose features are based at least on a set of actions performed by an entity, the features including one or more of position, size, color, or thickness; and
determine whether the entity is a bot or a human by inputting the image into a machine learning model to classify the image into a bot category or a human category, the machine learning model having been trained using a first set of training images of known bot entities whose behavior patterns are different from known human entities and a second set of training images of the known human entities having distinct image patterns, reflecting different behavior patterns, compared to the first set of training images of the known bot entities; and
present the entity to a user along with an option to take an action with respect to the entity in response to determining that the entity is a bot.

8. The computer-readable storage medium of claim 7, wherein the set of actions includes one or more browsing requests submitted by a browser of the entity to a website.

9. The computer-readable storage medium of claim 7, wherein the machine learning model uses a convolutional neural network to classify an input image into one of a plurality of categories.

10. The computer-readable storage medium of claim 9, wherein the instructions further cause the processor to:
generate the first set of training images based at least on a first set of actions performed by the known bot entities;
generate the second set of training images based at least on a second set of actions performed by the known human entities; and
train the machine learning model, using the first and second sets of training images, to classify the input image into the bot category or the human category.

11. A method, comprising:
receiving behavior information associated with an entity;
generating an image based at least on the behavior information, the image including features that depend on the behavior information;
classifying the image into a category among a plurality of categories using a machine learning model based on the features, the machine learning model having been trained using a plurality of sets of training images of known groups of entities, behavior patterns of the known groups of entities being different from one known group to another, image patterns of the plurality of sets of training images reflecting different behavior patterns and being distinct from one set to another;
determining a group among a plurality of groups to which the entity belongs based at least on the category to which the image is classified by the machine learning model; and
block or ignore future behavior by the entity in response to determining that the entity belongs to the group.

12. The method of claim 11, wherein receiving the behavior information comprises:
receiving one or more browsing requests submitted by the entity to a website.

13. The method of claim 12, wherein generating the image comprises:
generating a graph based at least on the behavior information; and
generating the image based at least on the graph.

14. The method of claim 13, wherein generating the graph comprises:
generating one or more nodes that represent the one or more browsing requests; and
generating one or more edges that connect the one or more nodes, the one or more edges representing adjacent browsing requests.

15. The method of claim 14, wherein generating the image comprises:
generating one or more spots that represent the one or more nodes in the graph; and
generating one or more lines that represent the one or more edges in the graph.

16. The method of claim 15, wherein generating the one or more spots comprises:
determining sizes of the one or more spots based at least on access frequencies associated with corresponding one or more nodes in the graph.

17. The method of claim 11, wherein the machine learning model is trained using the plurality of sets of training images to classify an input image into one of the plurality of categories.

18. The method of claim 17, wherein the machine learning model includes a convolutional neural network.

19. The method of claim 11, wherein the plurality of categories includes a bot category and a human category, and the plurality of groups includes a bot group and a human group.

20. The method of claim 19, further comprising:
generating an alert in response to determining that the entity belongs to the bot group.

* * * * *